United States Patent
Suenaga et al.

(10) Patent No.: US 7,005,405 B2
(45) Date of Patent: Feb. 28, 2006

(54) METAL OXIDE SINTERED STRUCTURE AND PRODUCTION METHOD THEREFOR

(75) Inventors: Seiichi Suenaga, Kanagawa-ken (JP); Takayuki Fukasawa, Kanagawa-ken (JP); Miho Maruyama, Kanagawa-ken (JP); Yasuhiro Goto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 168 days.

(21) Appl. No.: 10/233,497

(22) Filed: Sep. 4, 2002

(65) Prior Publication Data

US 2003/0064886 A1    Apr. 3, 2003

(30) Foreign Application Priority Data

Sep. 21, 2001  (JP)  ............................. P2001-288197
Jun. 3, 2002   (JP)  ............................. P2002-161582

(51) Int. Cl.
*B01J 21/04* (2006.01)
*B01J 23/02* (2006.01)
*B01J 23/58* (2006.01)
*B01J 23/72* (2006.01)
*B01J 23/00* (2006.01)

(52) U.S. Cl. .................. 502/439; 502/328; 502/331; 502/337; 502/345

(58) Field of Classification Search ................ 502/439, 502/527.12, 326, 327, 328, 331, 335, 337, 502/344, 345, 346, 355, 415
See application file for complete search history.

(56) References Cited

U.S. PATENT DOCUMENTS

| | | | | |
|---|---|---|---|---|
| 4,533,584 A | * | 8/1985 | Takeuchi et al. ............ | 428/116 |
| 4,749,671 A | * | 6/1988 | Saito et al. .................... | 502/64 |
| 4,882,130 A | * | 11/1989 | Asai et al. .................... | 422/310 |
| 5,318,757 A | * | 6/1994 | Abe et al. ..................... | 422/174 |
| 5,494,881 A | * | 2/1996 | Machida et al. .............. | 502/439 |
| 5,579,534 A | * | 11/1996 | Itoh et al. ..................... | 428/547 |
| 6,071,627 A | * | 6/2000 | Yasuda et al. ................ | 428/610 |
| 6,177,382 B1 | * | 1/2001 | Hesse et al. .................. | 502/439 |
| 6,194,083 B1 | * | 2/2001 | Yasuda et al. ................ | 428/615 |
| 6,277,489 B1 | * | 8/2001 | Abbott et al. ................. | 428/403 |
| 6,524,996 B1 | * | 2/2003 | Bender et al. ................ | 502/346 |

OTHER PUBLICATIONS

Keiichi Tomishige, et al. "Catalytic Performance and Carbon Deposition Behavior of a NiO-MgO Solid Solution in Methane Reforming with Carbon Dioxide under Pressurized Conditions", Ind. Eng. Chem. Res. vol. 39, No. 6, Feb. 28, 2000, pp. 1891-1897.

* cited by examiner

Primary Examiner—Cam N. Nguyen
(74) Attorney, Agent, or Firm—Oblon, Spivak, McClelland, Maier & Neustadt, P.C.

(57) ABSTRACT

The present invention is to provide a metal oxide sintered structure having a homogeneous catalyst supporting ability, and a production method therefor. Hardly reducing oxide powders and reducing oxide powders are mixed, and then kneaded with a binder. By extrusion molding, a structure comprising channels (fluid communicating holes) is formed. Then, after heating reaction and solid solution, it is reduced under an atmosphere containing a hydrogen. Thereby, a metal oxide sintered structure having the fluid communicating holes, with the metal particles precipitated on the surface is produced. The structure is suitable for use as a catalyst for a fuel cell, or the like.

11 Claims, 2 Drawing Sheets

METAL OXIDE SINTERED STRUCTURE AND PRODUCTION METHOD THEREFOR

BACKGROUND OF THE INVENTION

1. Field of the Invention

The present invention relates to a metal oxide sintered structure used as a catalyst in gas modification, gas synthesis, desulfurization, combustion, or the like. In particular, it relates to a metal oxide sintered structure with a metal catalyst precipitated on the honeycomb supporter surface or the foam-like supporter surface formed by sintering a metal oxide-, and a production method therefore.

2. Description of the Related Art

Recently, fuel cells attract attention dramatically as a power generation technique with little carbon dioxide emission and environmental load. Conventionally, in the fuel cells, an enriched hydrogen gas obtained by modifying a material fuel such as a hydrocarbon and a methanol has been used.

As a method for producing the hydrogen as the fuel for the fuel cells, a carbon dioxide modifying method or a water vapor modifying method, of reacting a hydrocarbon gas and a carbon dioxide or a water vapor on a catalyst, is known. According to the method, a modified catalyst structure with a catalyst containing fine particles of Ni, Co, or the like as the main active substance supported on the surface of a sintered compact made of an oxide ceramic comprising an alumina, a magnesia, a silica, or the like is used. To the catalyst system (catalyst and supporter), various characteristics such as a high activity at a low temperature, a long life and a high heat conductivity are required.

Moreover, a sulfur component is included in a city gas, or the like as the material gas for producing the hydrogen fuel for the fuel cell, and thus a desulfurization process for eliminating the same is executed.

In the desulfurization process, a composite catalyst of Mo, W, Nb, or the like and Ni, Co, or the like is used in the same form as the above-mentioned modified catalyst. Also in the desulfurization catalyst, various characteristics are required in terms of the activity of the catalyst, the life, or the like.

Accordingly, in the catalyst used in the fuel modifying process of the fuel cell, characteristics such as homogeneous dispersion of the metal particles as the catalyst on the supporter for supporting the catalyst and adhesion of the supporter and the metal particles without the risk of desorption of the catalyst particles during the catalyst operation, are indispensable so that the dispersion and the adhesion state of the catalyst supporter and the catalyst particles are important elements for controlling the above-mentioned catalyst functions.

The conventional fuel modifying catalyst has been produced by forming catalyst metal particles on the surface of a ceramic sintered compact by the co-precipitation method, or the like. The co-precipitation method is for obtaining a catalyst system with the catalyst particles comprising the metal fine particles dispersed on the catalyst supporter by reducing the fine particles after precipitating fine particles containing the catalyst element on the catalyst supporter.

According to this method, although the particle of the catalyst metal can be made smaller, it is difficult to control the dispersion state. Furthermore, a problem is involved in that the interface strength between the precipitated fine particles and the supporter is weak and the adhesion property is poor so that the particles have the aggregation growth during the drive under a heating environment so as to deteriorate the catalyst efficiency.

Moreover, particularly in the case of using a structure having non-round channels (fluid communicating holes) such as a honeycomb, since the corner parts of the channels serve as the prioritized precipitation sites of the catalyst metal particles, the catalyst is produced unevenly on the channel wall surface so that a problem is involved in that the numerical density of the catalyst particles is low in the parts other than the corner parts.

According to the conventional method, due to the above-mentioned problems, one having a sufficiently satisfactory performance has not been developed in terms of the life, the activity, or the like.

Accordingly, since the above-mentioned problems in the conventional catalyst supporting structure production have not been solved, for example, a carbon dioxide modifying catalyst for the hydrogen as the fuel gas for a fuel cell or a water vapor modifying catalyst sufficiently satisfactory has not been obtained in terms of the catalyst performance. Furthermore, in the case of using as the desulfurization catalyst, in addition to the above-mentioned problems, a problem is involved in that the sulfur can hardly be eliminated.

SUMMARY OF THE INVENTION

The present invention has been achieved for solving the above-mentioned problems of the conventional catalyst system, and an object thereof is to provide a catalyst system (catalyst and supporter) with a catalyst metal formed on the catalyst supporter surface evenly with a high density, a good interface adhesion between the supporter and the catalyst metal and a high function, and a production method therefor.

That is, a first aspect of the present invention may provide a metal oxide sintered structure comprising a partition wall substantially made of a sintered compact as a solid solution phase of a reducing metal oxide and a hardly reducing metal oxide formed so as to surround channel (a fluid communicating hole) provided so as to allow passage of a fluid, and metal particles existing on the partition wall surface of the metal oxides, wherein the metal particles are precipitated from the metal oxide sintered compact comprising the partition wall by the hydrogen reduction.

According to the first aspect, it is preferable that the above-mentioned reducing metal oxide is a nickel oxide, a cobalt oxide, a copper oxide alone, or a mixture thereof, and the hardly reducing metal oxide is a magnesium oxide.

Moreover, in the case of using the metal oxide sintered structure for processing the hydrocarbon such as a methane, as to the mixture ratio of the copper oxide and the magnesium oxide, 0.1% or more and 5% or less in the atomic ratio with respect to the magnesium oxide is preferable for improvement of the conversion efficiency.

In contrast, in the case of using the metal oxide sintered structure for processing aliphatic lower alcohols such as a methanol and an ethanol, 0.1% or more and 20% or less in the atomic ratio of the copper oxide with respect to the magnesium oxide is preferable for improvement of the sintering property of the porous substance and further more in terms of precipitation of the metal copper. It is further preferably 1% or more and 10% or less.

Furthermore, in embodiments of the present invention, it is preferable that the metal particle amount in the partition wall corner parts of the above-mentioned channels is double as much as the metal particle amount in the partition wall flat surface part or less.

A second aspect of the present invention may provide a production method for a metal oxide sintered structure comprising:

mixing and kneading at least two kinds of reducing metal oxide powders and hardly reducing metal oxide powders and an organic binder, forming a compact having channels so as to allow communication of a fluid by extrusion molding of the mixture, forming a metal oxide sintered structure precursor by eliminating the organic binder in the compact, sintering the reducing metal oxide and the hardly reducing metal oxide by heating the metal oxide sintered structure precursor, and precipitating the metal particles on the sintered compact surface by reducing the reducing metal oxide by reducing the sintered compact in a hydrogen atmosphere.

As a metal oxide sintered structure of the present invention, a honeycomb or foam-like structure can be adopted.

DETAILED DESCRIPTION OF THE INVENTION

Hereinafter, a metal oxide sintered structure, a production method therefore, and furthermore, a production method for a metal oxide sintered structure having composite metal particles according to the present invention will be explained specifically.

[Metal Oxide Sintered Structure]

Metal Oxide Sintered Structure

Figure 1:
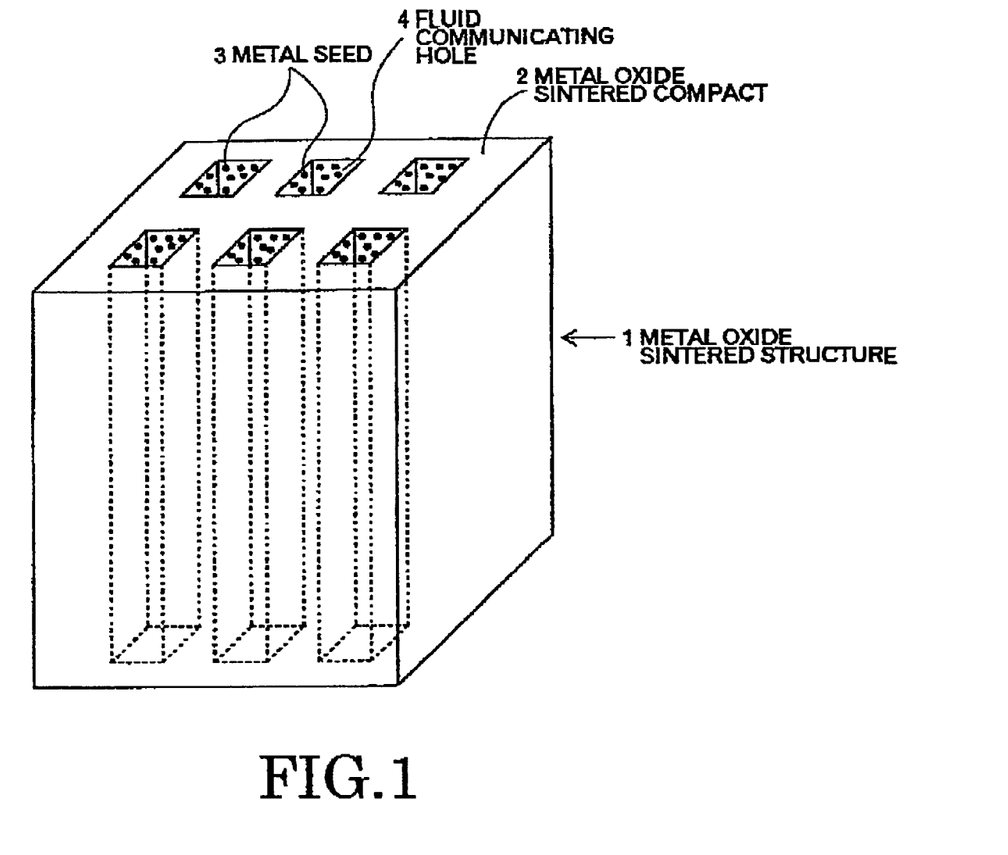
FIG. 1 is a schematic diagram of a metal oxide sintered structure according to the present invention.

FIG. 1 shows a schematic diagram of a metal oxide sintered structure of the present invention. As shown in the figure, the metal oxide sintered structure 1 of the present invention comprises a partition wall part 2 made of a metal oxide sintered compact, metal particles 3 to be catalyst particles, and fluid communicating holes (channels) 4 surrounded by the metal oxide sintered compact partition wall so as to allow passage of a fluid such as a gas and a liquid. It is preferable that the sintered structure is a structure with the so-called honeycomb structure, having a plurality of the fluid communicating holes (channels) 4 elongating parallel in the one axis direction of the sintered compact. The cross-sectional shape of the fluid communicating holes (channels) 4 may be a polygon such as a triangle, a quadrilateral and a hexagon, or a round shape. However, since the center part of the partition wall part 2 does not provide the function as a catalyst in the case the sintered structure is used as a reaction catalyst, the partition wall part 2 has an even and thin thickness as long as the sintered structure has a mechanical strength to the extent not to be easily broken, and thus a non-round shape is preferable.

According to such a structure, the gas or the fluid can pass the inside of the holes efficiently as well as it is advantageous in that the sintered compact itself can be maintained densely with a high strength.

Moreover, the ratio of the channels per the area of the entire sintered structure in the cross-section perpendicular to the channel arrangement direction in the metal oxide sintered structure of the present invention is preferably 20 to 75% by area. In the case the ratio is more than the above-mentioned ratio, the strength of the metal oxide sintered structure cannot be maintained. In contrast, in the case it is less than the above-mentioned ratio, the pressure loss of the gas to be processed is made larger.

Furthermore, the area of each channel is preferably in a range of 0.2 to 1 mm$^2$ in order to increase the catalyst efficiency thereof. Moreover, the cross-sectional shape of all the channels is preferably same for the production convenience and restraining the increase of the partition wall part null portion in the sintered structure.

Metal Oxide Sintered Compact

In the present invention, the metal oxide sintered compact is provided with the solid solution phase of a reducing oxide and a hardly reducing oxide as the main component so as to serve as the partition wall part forming the channels.

In the present invention, the reducing metal oxide denotes a metal oxide to be reduced to a metal under a hydrogen atmosphere at a room temperature to 1,500° C. As preferable examples of the reducing metal oxide, oxides of Cu, Co, Fe, Ni, Zn, Sn, Cd, Pd, Ag, Mo, Nb, or the like can be presented. Among these examples, in the case of using as a catalyst for modifying a gas, synthesizing a gas, or the like, a nickel oxide, a cobalt oxide, an iron oxide and a copper oxide are preferable for high catalyst efficiency. As further preferable metal oxides, a nickel oxide, a cobalt oxide and a copper oxide can be presented.

Moreover, the above-mentioned reducing oxides can be used in a combination of two or more kinds. Use of the reducing oxides in a combination of two or more kinds is preferable for improving the catalyst function property after the reduction particularly in the case of using as a catalyst. Moreover, use of one having a melting point lower than that of the oxide of the mother phase as one of the two or more kinds of the reducing oxides is preferable since the sintering property can be promoted with the added reducing oxide serving as the sintering auxiliary agent so as to form a highly strong skeleton. As specific examples of the reducing oxides used therefor, a copper oxide, a tin oxide, a silver oxide, or the like can be presented. Among these examples, a composite oxide of a nickel oxide and a cobalt oxide or a copper oxide is preferable.

In the present invention, the hardly reducing metal oxide denotes a metal oxide not to be reduced to a metal under a hydrogen atmosphere at a room temperature to 1,500° C. As preferable examples of the hardly reducing metal oxide, oxides of Al, Mg, Si, Zr, Ti, Hf, Ce, or the like can be presented. Moreover, these can be used in a combination of two or more kinds. Among these examples, a magnesium oxide, a zirconium oxide, an aluminium oxide and a cerium oxide are preferable for formation of a stable solid solution, and a magnesium oxide is further preferable.

For the details of these oxides, for example, an article "Metal Oxide and Hydrogen Reduction of Sulfide" disclosed in page 277 of Japan Society of Metals (1974, vol. 13) can be referred to.

The metal oxide sintered compact of the present invention is a solid solution of the above-mentioned reducing metal oxide and the above-mentioned hardly reducing metal oxide. As such a solid solution, the total ratio solid solution of the oxides such as NiO—MgO, CoO—MgO, FeO—MgO, NiO—CoO—MgO, or the like may be used. Or a system with 1 atomic % or more solid solution limit of the reducing metal oxide with respect to the hardly reducing metal oxide at the hydrogen reducing temperature such as ZrO$_2$—NiO, MgO—NiO—CuO, MgO—CuO, and MgO—CuO—ZnO may be used. Moreover, a solid solution of a composite oxide of the reducing metal oxide and the hardly reducing metal oxide, and thus it is not particularly limited.

Moreover, to the above-mentioned combinations, a still another reducing metal oxide can be included as a solid solution. In this case, an advantage of providing the metal particles as an alloy can be achieved.

In the present invention, in the case a metal oxide sintered structure according to the present invention produced by using one prepared by adding a copper oxide to at least one of a nickel oxide and a cobalt oxide as the reducing metal oxide and a magnesium oxide as the hardly reducing metal oxide is used for processing a hydrocarbon such as a methane, it is preferable to use the copper oxide in a range of 0.1 to 5% atomic ratio with respect to the magnesium oxide because the addition of the copper oxide improves the sintering property. In the case the atomic ratio is lower than the above-mentioned range, it is problematic in that the sintering property cannot be improved. In contrast, in the case it is higher than the above-mentioned range, it is problematic in that the precipitation of the carbon is increased, and thus neither is preferable.

On the other hand, in the case the metal oxide sintered structure is used for processing a lower aliphatic alcohol such as a methanol and an ethanol, it is preferable to use the copper oxide in a range of 0.1 to 20 atomic % with respect to the magnesium oxide. The range is further preferably 1% to 10% because the sintering property can be improved as well as the modifying function can be improved. In the case the atomic ratio is lower than then above-mentioned ratio, it is problematic in that the deterioration of the sintering property and the deterioration of the modifying function. In contrast, in the case it is higher than the above-mentioned range, it is problematic in that the organization unevenness is generated, and thus neither is preferable.

In the metal oxide sintered compact of the present invention, it is preferable that the density of the metal oxide sintered compact to be the skeleton is 80% or more because generation of unnecessary metal particles in the sintered compact skeleton can be prevented at the time of the hydrogen reduction. The density is further preferably 90% or more.

Moreover, the partition wall part thickness in the metal oxide sintered compact of the present invention is preferably 100 $\mu$m or more because in the case it is less than that, the sintered compact skeleton strength is poor so that a problem of breakage, or the like can be involved. The partition wall thickness is preferably 200 $\mu$m or more, and further preferably 500 $\mu$m or more.

The particle size of the sintered compact particles comprising the metal oxide skeleton in the present invention is not particularly limited, but it is preferably 1 $\mu$m or more because defects formed in the grain boundary, or the like can be reduced. It is further preferably 10 $\mu$m or more, and still further preferably 100 $\mu$m or more.

Metal Particles

Metal particles according to the present invention are precipitated form the above-mentioned metal oxide sintered compact skeleton by the hydrogen reduction, existing on the surface of the metal oxide sintered compact. That is, the metal particles according to the present invention are obtained by precipitating the metal component of the reducing metal oxide as the component of the sintered compact on the dimpling surface of the sintered compact by the hydrogen gas reduction of the metal oxide sintered compact. The metal particles accordingly obtained have a good adhesion property with respect to the metal oxide sintered compact so as to be supported closely and stably compared with the metal particles obtained by deposition from the outside by the co-precipitation method or the like. That is, the interface structure can be stabilized physically and chemically. Therefore, for example in the case of using as a catalyst, aggregation of the metal particles and grain growth can be restrained so as to prolong the life of the catalyst efficiency.

Accordingly, since the metal particles of the present invention are obtained by reducing the reducing metal oxide, the composition thereof depends on the reducing metal oxide. Therefore, as preferable examples of the metal comprising the metal particles, like the above-mentioned reducing metal oxides, Cu, Co, Fe, Ni, Zn, Sn, Cd, Pd, Hg, Ag, or the like can be presented. Among these examples, in the case of using as a catalyst for modifying a gas, synthesizing a gas, or the like, Ni, Co, Fe, Pd and Cu are preferable for obtaining a high catalyst efficiency. Metal particles containing these metals as the main component with at least one of them included by 50 atomic % or more are preferable. Moreover, as an additional metal to be added in addition to the above-mentioned main component metals, Cu, Sn, Ag, Zn, or the like can be presented. A Cu can be used either as the main component or as the additional metal.

A metal oxide sintered structure can be produced from the above-mentioned metal oxide sintered compact skeleton and the metal particles formed on the sintered compact surface.

According to the metal oxide sintered structure of the present invention, the average particle size of the metal particles on the sintered compact surface is 500 nm or less, more preferably 100 nm or less, and further preferably 50 nm or less. Moreover, the numerical density is preferably $1 \times 10^{13}$ pieces/m$^2$ or more and $1 \times 10^{15}$ pieces/m$^2$ or less because the grain growth can be restrained effectively in the case of using as a catalyst under this condition.

The method for measuring the above-mentioned numerical density is not particularly limited. For example, it is preferable to measure the numerical density in an area of 100 nm$\times$100 nm to 1 $\mu$m$\times$1 $\mu$m at the time of taking the surface photography with an electron microscope. Moreover, at the time of measuring the numerical density, only the metal particles in contact with the surface of the metal oxide skeleton are used as the subject of the measurement because the particles on the particles lead to the grain growth so that they are not considered to be an effective catalyst.

Moreover, the particle interval is not particularly limited, and it is preferably ½ time as much as the particle size, and more preferably 1 time or more because the grain growth can easily be restrained under the condition.

Furthermore, it is preferable that the metal particles according to the present invention have $1 \times 10^{16}$ pieces/m$^3$ or more and $1 \times 10^{19}$ pieces/m$^3$ or less metal particle numerical density per volume of a unit hole of the channels comprising the metal oxide sintered structure to be provided by the present invention because the combination performance of the porous substance and the catalyst particles can be provided effectively in the range of the condition.

Moreover, it is preferable that the metal particles of the present invention have the metal particle amount at the intersection parts of the partition wall parts in the unit hole, that is, at the corner parts 2 times or less as much as the metal particle amount in the partition wall part flat parts.

Figure 2:
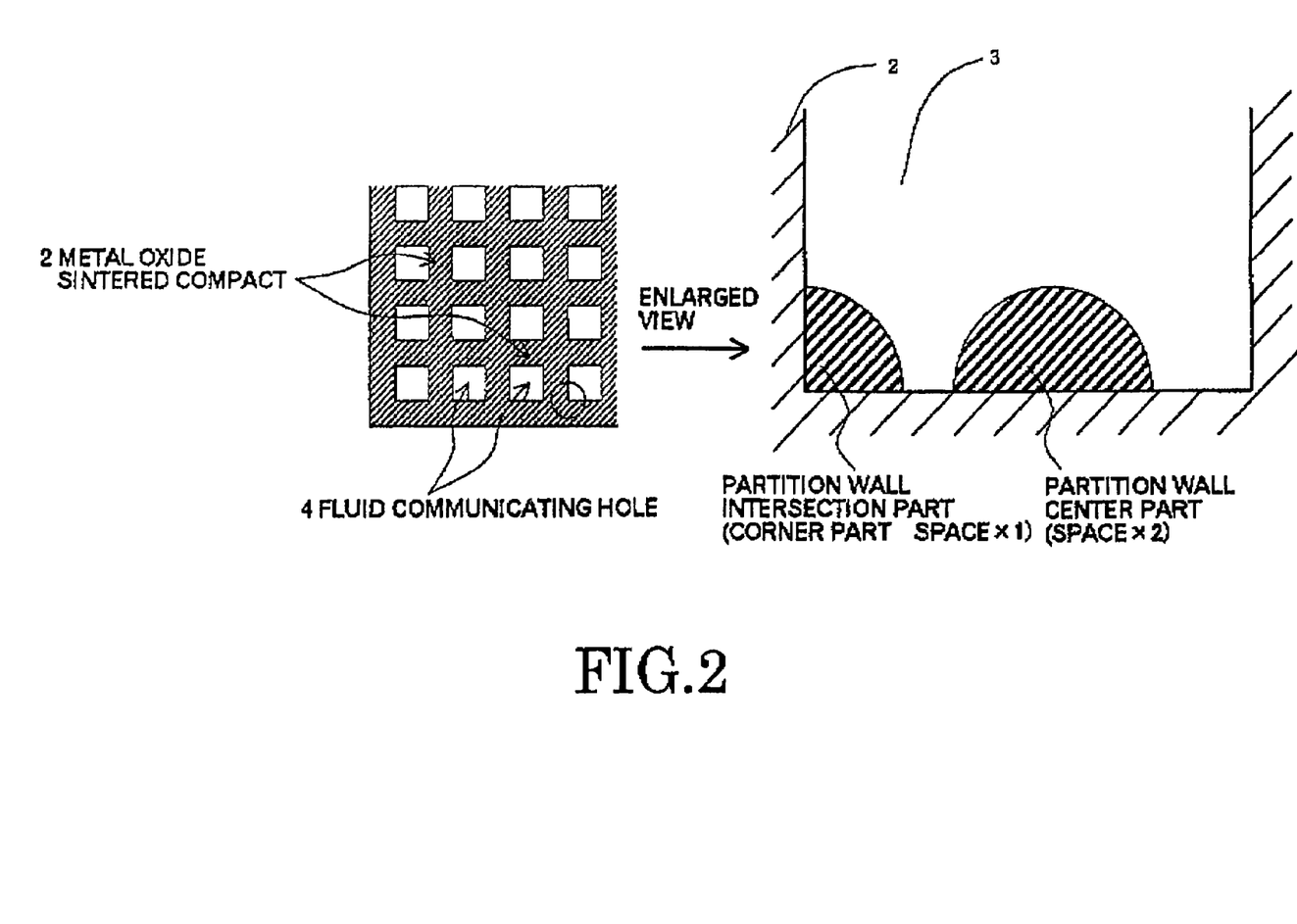
FIG. 2 is an explanatory diagram for the inside of the fluid communicating holes (channels) of the metal oxide sintered structure of the present invention.

The above-mentioned metal particle amount in each part of the partition wall is defined by the density with respect to the space as shown in FIG. 2. That is, with the premise that the catalyst amount (m1 g) in a certain space X1 (x1 cc) of the corner parts of the partition wall is x1/m1 (g/cc) and the catalyst amount (m2 g) in a space of the same volume X2 (x2 cc) of the wall surface in the center part of the cell partition wall is x2/m2 (g/cc), it is defined to be $$(x1/m1)/(x2/m2) \leq 2.$$

Under this condition, for example, in the case of using as a catalyst, wasteful consumption of the catalyst can be reduced.

[Production Method for the Metal Oxide Sintered Structure]

Next, the production method for a metal oxide sintered structure according to the second aspect of the present invention will be explained.

The production method comprises three steps of adjustment of the material powders and production of the precursor, the solid solution reaction, and the hydrogen reduction.

Adjustment of the Material Powders and Production of the Compact

The first step of the metal oxide sintered structure of the present invention is a step of obtaining the material powders by mixing the reducing metal oxide powders and the hardly reducing metal oxide powders.

In the present invention, the method for mixing the material powders is not particularly limited. For example, it can be carried out by measuring the powders by an appropriate amount according to the application and mixing the same using a ball mill, or the like.

As the metal oxide powders used for mixing, those having 0.05 to 10 μm average particle size are preferable. In the case the average particle size is larger than the above-mentioned range, a homogeneously mixed product can hardly be obtained so that the mixed system of the reducing metal oxide and the non-reducing metal oxide in the sintered compact can easily be non-homogeneous. As a result, the metal particles to be produced are non-homogeneous so as to shorten the catalyst life. In contrast, in the case the average particle size of the metal oxide is lower than the above-mentioned range, handling becomes difficult so as to deteriorate the productivity.

According to a preferable embodiment of the present invention, as to the mixture ratio of the reducing metal oxide and the hardly reducing metal oxide powders, 60 mol % or more mole ratio of the hardly reducing oxide is included. Thereby, the sintered compact strength is maintained after sintering and hydrogen reduction so as to enable use under a higher temperature environment. It is more preferably 70 mol % or more, and further preferably 80 mol % or more.

After mixing the above-mentioned material powders, the powder mixture is kneaded by a kneader with an organic binder added. As to the kind of the organic binder to be added at the time, a condition adopted in extrusion molding of a common ceramic compact can be selected optionally and it is not particularly limited. For example, a PVA (polyvinyl alcohol), an ethyl cellulose, or the like ordinarily used can be adopted. Moreover, the addition amount of the organic binder is not particularly limited, and it can be used by the 5 wt % or more and 20 wt % or less amount ordinarily adopted.

The material powders kneaded with the organic binder added is introduced into an extrusion molder having a mouthpiece of an appropriate shape so as to be extrusion molded through the mouthpiece. At the time, the extrusion speed, or the like is not particularly limited and a condition not to lead to breakage at the time of extrusion is selected.

Next, after the extrusion molding, the compact is introduced into a debinding furnace for heating and debinding, that is, the organic binder component is eliminated. The debinding condition differs depending upon the kind of the organic binder, or the like, and it is preferable to raise the temperature to about 500° C. by about 1° C. per minute, and maintaining for several hours for cooling off in the furnace without quenching. According to the steps, the metal oxide sintered structure precursor of the present invention can be obtained.

Moreover, in the case a magnesium oxide is used as the hardly reducing metal oxide main component and a copper oxide added to the material powders, it can be used for a porous substance other than the honeycomb such as a foam because the copper oxide makes the ceramic sintered compact containing the magnesium oxide as the main component denser so as to improve the sintering property. Thereby, the reducing reduction resistance property in the subsequent reducing step can be improved so that the strength deterioration can be restrained to the minimum level. For having the metal oxide sintered structure of the present invention in a foam-like form, a conventionally known production method for a porous ceramic can be adopted. Specifically, by impregnating an organic polymer porous substance such as a urethane foam with a slurry with the material powders dispersed in a dispersion medium such as an ethanol, drying and heating for burning off the urethane foam so as to form a foam-like metal oxide sintered structure, and baking thereafter so as to provide a metal oxide sintered structure.

Solid Solution Reaction

Then, the metal oxide sintered compact precursor obtained in the above-mentioned step is introduced into an atmosphere furnace for heating and baking so as to produce a solid solution. The reaction temperature is 1,000° C. or more and 1,500° C. or less, preferably 1,100° C. or more and 1,400° C. or less. In the case the baking temperature is less than the range, the sintering operation is incomplete so as to have the sintered compact mechanical strength insufficient. In contrast, in the case the baking temperature is more than the above-mentioned range, the reducing metal oxide as the material may be decomposed or melted. Moreover, the temperature raising or lowering speed is not particularly limited, and about 1 to 5° C. per minute condition is preferable for preventing breakage by the thermal distortion.

The solid solution baking temperature in the case of adding a copper oxide, or the like having a liquid phase temperature lower than the ceramic of the mother phase may be higher than the liquid phase temperature of the above-mentioned low melting point ceramic. For example, in the case of a copper oxide, a temperature higher than the eutectic temperature of the copper oxide and the copper as the melting point thereof may be used.

Moreover, in the case of a solid solution of a nickel oxide and a magnesium oxide, the sintering property can be improved by setting the baking temperature at the eutectic temperature of the nickel oxide and the nickel or higher.

Hydrogen Reducing Step

After production of the metal oxide sintered structure by the above-mentioned solid solution reaction, the sintered structure is introduced into a reducing furnace such as a hydrogen furnace for executing the reducing process so as to precipitate the metal particles on the sintered compact surface. For example, in the case NiO—MgO is used as the sintered structure, a part of the solid solution is reduced so that Ni phase is precipitated on the inner wall surface of the channel as the sintered compact surface of the metal oxide sintered structure. Thereby, the metal particles can be dispersed on the oxide sintered structure surface homogeneously with a high density. Moreover, since the metal is diffused and precipitated from the inside of the sintered compact, a sintered compact can be obtained with a good dispersion state with little segregation.

The reducing condition of the present invention is not particularly limited, and it is preferable to select a condition capable of reducing only the sintered compact surface of the metal oxide sintered structure.

For example, in addition to a method of raising temperature, reduction and cooling after having a constant hydrogen partial pressure in the hydrogen furnace, a method of raising the temperature to the reducing temperature after purging the inside of the hydrogen furnace with an inert gas such as Ar, raising the hydrogen partial pressure gradually after reaching the reducing temperature for reduction can be considered. In the case of this method, since the reduction is carried out slightly from the sintered compact wall surface, the metal particles can be precipitated only on the sintered compact surface. Moreover, also in the case of using two or more kinds of the reducing metal oxides, the above-mentioned method is effective because even in the case of using two or more kinds of the reducing metal oxides having different reduction reaction starting temperatures, the metal particles can be precipitated substantially simultaneously by shortening the time lag of the metal precipitation so that homogeneous composite metal particles can be obtained.

In the present invention, as mentioned above, the average particle size of the metal particles on the metal oxide sintered structure surface is preferably 500 nm or less, or 100 nm or less, or 50 nm or less. Moreover, the numerical density is preferably $1 \times 10^{13}$ pieces/m$^2$ or more and $1 \times 10^{15}$ pieces/m$^2$ or less. In producing the sintered structure with the surface state, the nature of the above-mentioned metal particles to be produced is differed depending on the mixing ratio of the reducing metal oxide and the non-reducing metal oxide, the hydrogen partial pressure at the time of the hydrogen reduction process and the processing temperature at the time of the hydrogen reduction process. As to the mixing ratio of the reducing metal oxide and the non-reducing metal oxide, the particle size of the metal particles is made smaller with a lower reducing metal oxide ratio and the numerical density is increased. Therefore, by selecting the optimum reaction condition according to the reaction system, the metal particles in the above-mentioned range can be produced.

In the present invention, particularly in the case of a catalyst for modifying the methane, the natural gas or the city gas, the reduction reaction starting temperature is not particularly defined, and it is preferably 800° C. or higher because promotion of the reduction reaction during use of the metal oxide sintered structure of the present invention can be prevented thereby.

The metal particles precipitated on the surface of the channels of the sintered compact by the above-mentioned reduction step have an extremely homogeneous property unlike the metal particles formed by the conventional method such as the dipping method.

Accordingly, the metal oxide sintered structure can be produced by the above-mentioned production steps. This is advantageous in that the operation can be enabled at a low cost since the process can be simplified compared with the wet method such as the co-precipitation method.

[Production Method for the Metal Oxide Sintered Structure Having the Composite Metal Particles]

The third aspect of the present invention is for producing second metal particles different from the first metal particles so as to provide the composite configuration with the first metal particles of the metal oxide sintered structure obtained by the above-mentioned production method of the second aspect, or the ruggedness appearing on the skeleton structure surface after precipitation of the metal particles by the reduction as the core. This method is a method for providing metal particles of Ni, Co, Fe, or the like further as an alloy. It is preferable to adopt the same for the reducing oxide with a low solid solution limit with respect to the hardly reducing metal oxide or one with the unstable metal oxide.

As the above-mentioned metal, precious metals such as an Au, Pt, Pd, Ru, Rh, Ir, and Os, or Mo, Nb, W, or the like can be presented. These metals can be provided alone as an alloy or it can be provided as a multiple element type alloy by providing two or more kinds as an alloy.

The third aspect of the present invention basically comprises a process of soaking the metal oxide sintered structure in an atmosphere (gas or liquid) containing an oxide of an additional element by the wet method or the dry method, and a subsequent drying and reducing process. That is, this is for obtaining a catalyst as an alloy by providing a metal compositely by the precipitation method, the soaking method or the ion exchange method to the metal particles formed on the metal oxide sintered structure obtained by the above-mentioned method. Soaking process to the additional element atmosphere In the case of the wet method, it comprises the steps of soaking the metal oxide sintered structure obtained by the above-mentioned method in a liquid of a heteropoly acid, a metal complex, a metal salt, or the like containing the additional purposed metal element for precipitating the compound containing the additional purposed metal element on the surface of the metal oxide sintered structure, drying and decomposing the same for providing the metal particles on the sintered compact surface in a composite configuration.

First, the precipitation of the additional purposed element containing compound can be carried out by soaking the metal oxide sintered structure in the above-mentioned liquid, adding an acid or an alkaline for the pH adjustment and executing the co-precipitation from the liquid phase, or it can be carried out by heating or acidification decomposition of the metal salts. By utilizing the metal particles precipitated on the sintered compact surface as the core producing site of the additional metal at the time of precipitation of the additional metal from the liquid phase, the additional metal can be processed further effectively to an alloy. According to the soaking method, the additional metal component solution is not particularly limited, and a compound containing a metal for the composite process, and soluble in a solution can be used.

For example, in the case Pt is used as the metal for the composite process, an aqueous solution of a platinum chloride acid, a tetraammine platinum chloride, or the like can be used. Moreover, in the case of using Mo or W, an ammonium methtungsten, an molybdenum acetyl acetonate, or the like can be used.

At the time of the pH adjustment of the above-mentioned additional purposed element containing compound, as the precipitating agent, an alkaline aqueous solution of an ammonium carbonate, a sodium carbonate, an ammonium, or the like can be used.

After precipitation of the second metal particles on the first metal particle surface in the above-mentioned step, a drying operation and a heating operation are carried out for reduction and providing an alloy. The heating atmosphere is not particularly defined, and an inert atmosphere such as Ar, $N_2$, a vacuum, a reducing atmosphere such as a hydrogen, or the like can be presented. The heating temperature can be selected optionally according to the combination of the materials.

[Effects]

By the above-mentioned steps, a reducing oxide with a little solid solution limit with respect to the metal oxide as the above-mentioned metal oxide sintered structure skeleton or a metal oxide as an unstable metal itself can be provided as the alloy with the above-mentioned first metal particles on the metal oxide sintered structure surface.

As an alloy system to be used in the present invention, a multiple element system alloy of two element system or more with Ni, Co or Fe can be considered. For example, an alloy with a precious metal such as NiPt, NiAu, CoPt, CoAu, FePt and FeAu, an alloy such as NiMo, NiW, NiNb, CoMo, CoW, and CoNb, or the like can be presented.

By the above-mentioned steps described in detail, an anisotropic composite porous substance of the present invention can be produced. According to the production method of the present invention, a minute catalyst member can be produced with a high numerical density controlling property simply at a low cost compared with the case of supporting a catalyst on the inner wall of a porous substance by the process of a co-precipitation method, or the like.

Moreover, the catalyst at the time is homogeneous so as not to support the particles with deviation. Therefore, the unhomogeneous property observed in the conventional method in the cell, in particular at the corner parts can be prevented so that the catalyst can be utilized effectively.

Furthermore, the catalyst at the time has a configuration with the most part of the particles contacted with the dent of the skeleton surface on the line or on the surface. Therefore, particle aggregation and growth observed according to passage of the time in the catalyst of the conventional method contacted with the porous substance wall surface can be prevented so that the performance deterioration of the catalyst according to passage of the time can be restrained.

The reason for the configuration will be explained below.

The precipitation of the metal particles is derived from the substance movement from the skeleton. The metal particle precipitation denotes basic reduction of the skeleton. Therefore, the periphery of the part with the metal particle precipitation has an organization with a dented skeleton. Furthermore, since the precipitated particles grow always on the skeleton surface, the precipitation configuration of tracing the dent is provided.

[Application]

The metal oxide sintered structure of the present invention described above is suited for use as a modifying catalyst for a methane, a modifying catalyst for a methanol ethanol, or a desulfurization catalyst.

In the case the metal oxide sintered structure of the present invention is used as a modifying catalyst for a methane, it is preferable that it is provided as a structure with particles of Ni, Co, and Fe precipitated on the sintered compact surface. Moreover, at least one of Ni, Co, and Fe of the metal oxide sintered structure provided as an alloy with Cu, Sn, or the like, or a metal containing at least one of Ni, Co, and Fe or an alloy thereof provided as an alloy with Pt, Pd, Ir, Ru, Rh, or the like by the post process can be considered.

Moreover, in the case of using as a modifying catalyst for a methanol or an ethanol, at least one of Cu, Ni, Co, and Fe or an alloy thereof provided as an alloy with Pt, Pd, Ir, Ru, Rh, or the like by the post process can be considered.

Furthermore, as a desulfurization catalyst of a liquid and a gas from a hydrocarbon based fuel, at least one of Ni, Co, and Fe or an alloy thereof provided as an alloy with at least one selected from Mo, Nb, W, or the like can be considered.

The above-mentioned applications are not particularly limited, and they can be applied for different applications.

Moreover, the materials of the metal oxide sintered structure to be the supporter or the supporting member for the above-mentioned metal catalysts are not particularly limited in the case of using the mechanism of the present invention.

Furthermore, in addition to the methane modification, the methanol modification, and the desulfurization catalyst, the metal oxide sintered structure of the present invention can also be used for the other catalyst applications, such as modification of higher hydrocarbon liquids such as an ethanol, a light oil and a gasoline, and modification of higher hydrocarbon gases such as an ethane and a propane.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

Example 1

Powders of 1 μm average particle size NiO and 0.1 μm or less average particle size MgO were measured by 1:2 mole ratio, and mixed homogeneously by a planetary ball mill. After the mixture, an ethyl cellulose based binder was added to the powder mixture so as to be kneaded. A compact was produced using an extrusion molder through a honeycomb mouthpiece having 1 mm cell size and 0.5 mm wall thickness. Then, with the compact introduced into a debinding furnace, the temperature was raised to 350° C. over 5 hours per each minute for debinding at 350° C. for 1 hour. After debinding, with the specimen moved to an atmosphere furnace, the temperature was raised to 1,300° C. over 10 hours for sintering at 1,300° C. for 5 hours.

The honeycomb sintered compact accordingly obtained has 1 mm unit cell (hole) size and 0.5 mm wall thickness as purposed.

The honeycomb sintered compact cut out for 2 cc size was introduced into an apparatus for a methane modification experiment. After substitution by an argon gas, it was further substituted by a hydrogen gas by 100 ml per minute. The temperature was raised to 800° C. by 10° C./minute speed for reduction at 800° C. for 5 minutes so as to produce a metal oxide sintered structure of this example.

After the reduction, with the temperature lowered to 750° C., the modification reaction was carried out with the hydrogen gas supply stopped and the methane gas flowing per 50 ml/minute and a carbon dioxide gas per 50 ml/minute. As to the modification reaction, the gas after the reaction was sampled by the mass analysis for measuring the gas composition quantatively for the measurement of the modification efficiency.

The modification reaction was carried out continuously for 5 hours. The residual methane density was measured before and after the start of the reaction. With a lower density of the residual methane, the modification efficiency is high. Furthermore, with a smaller change amount before and after the reaction, the deterioration by the time passage is slight. Moreover, the particle size of the metal particles was measured after the modification by the organization observation.

The results are shown in the Table 1.

On the other hand, the organization embodiment of the metal oxide sintered structure produced by the above-mentioned production method was observed by the FE-SEM. The observation was carried out by counting the number of particles in the field of view in a square of 200 nm side by the 50,000 times magnification. The operation was carried out by the 10 fields of view. As a result, fine particles of 85 nm average diameter existed on the honeycomb structure partition wall surface by about $1 \times 10^{14}$ pieces/m$^2$ density.

Moreover, the metal particles were contacted with the partition wall by 100% in the field of view. Furthermore, the intersection parts of the honeycomb partition walls, that is, the corner parts of the same specimen were observed. As a result, the unhomogeneous property was not observed in a range within 1 μm from the corner parts, and the precipitation embodiment of the metal particles was homogeneous in all the range from the corner parts to the wall surface center parts.

Moreover, the metal particles were contacted with the surface at the dent parts slightly formed on the honeycomb surface.

Example 2

A metal oxide sintered structure was produced in the same process as in the example 1 except that a powder mixture of NiO and CuO was used instead of NiO powders by a mixture ratio of MgO:NiO:CuO=2:1:0.05 (mole ratio).

The honeycomb sintered compact was introduced into an apparatus for a methane modification experiment. After substitution by an argon gas, it was further substituted by a hydrogen gas by 100 ml per minute. The temperature was raised to 900° C. by 10° C./minute speed for reduction at 900° C. for 10 minutes.

After the reduction, with the temperature lowered to 750° C., the modification reaction was carried out with the hydrogen gas supply stopped and the methane gas flowing per 50 ml/minute and a carbon dioxide gas per 50 ml/minute. As to the modification reaction, the gas after the reaction was sampled by the mass analysis for measuring the gas composition quantatively for the measurement of the modification efficiency.

On the other hand, the organization embodiment of the produced metal oxide sintered structure of this example was observed by the FE-SEM. The observation was carried out by counting the number of particles in the field of view in a square of 200 nm side by the 50,000 times magnification. The operation was carried out by the 10 fields of view. As a result, fine particles of 20 nm average diameter existed on the honeycomb skeleton surface by about $1\times10^{13}$ pieces/m$^2$ density.

Example 3

A metal oxide sintered structure was produced in the same process as in the example 1 except that a powder mixture of NiO:MgO=5:2 (mole ratio) was used instead of NiO powders.

The honeycomb sintered compact was introduced into an apparatus for a methane modification experiment. After substitution by an argon gas, it was further substituted by a hydrogen gas by 100 ml per minute. The temperature was raised to 850° C. by 10° C./minute speed for reduction at 850° C. for 10 minutes.

After the reduction, with the temperature lowered to 750° C., the modification reaction was carried out with the hydrogen gas supply stopped and the methane gas flowing per 50 ml/minute and a carbon dioxide gas per 50 ml/minute. As to the modification reaction, the gas after the reaction was sampled by the mass analysis for measuring the gas composition quantatively for the measurement of the modification efficiency.

On the other hand, the organization embodiment of the produced metal oxide sintered structure of this example was observed by the FE-SEM. The observation was carried out by counting the number of particles in the field of view in a square of 200 nm side by the 50,000 times magnification. The operation was carried out by the 10 fields of view. As a result, fine particles of 20 nm average diameter existed on the honeycomb skeleton surface by about $5\times10^{13}$ pieces/m$^2$ density.

Example 4

With the metal oxide sintered structure as a honeycomb porous substance produced in the example 3 used, a soaking reaction was further carried out using an $(NH_3)_2Pt(NO_2)_2$ and an ethanol. After soaking, it was dried at 110° C. and heated in a hydrogen of 400° C. so as to produce an alloy.

The porous substance after the alloy formation was observed by the FE-SEM so as to find that Ni was processed to be an alloy with the Pt. According to composition measurement by the EDX, it was found that Ni:Pt=1:1 (atomic ratio).

The modification experiment as in the example 1 was carried out using the metal oxide sintered structure produced as mentioned above in this example.

Comparative Example 1

An alumina honeycomb was produced in the same shape as in the example 1. After soaking in a nickel nitrate, the honeycomb was taken out so as to be soaked in an ammonium carbonate. Then, the honeycomb was taken out for drying in a drier at 110° C., and it was heated to 400° C. in a hydrogen for reduction.

According to observation of the organism after the reduction by the FE-SEM, Ni particle size was 100 nm, and the numerical density was $5\times10^{12}$ pieces/m$^2$. Moreover, Ni particle aggregation was observed at the partition wall intersection parts (corners) of the honeycomb, and the numerical density per volume within 0.5 μm from the intersection parts was more than 3 times as much as that of the partition wall center parts.

Using the honeycomb, the modification experiment as in the example 1 was carried out.

The results are shown in the Table 1.

TABLE 1

|  | Metal particles | Metal oxide skeleton | Cu/Ni atomic ratio (%) | Metal particle diameter (before reaction → after reaction) | Residual methane density after 30 minutes from starting the reaction | Residual methane density after 5 hours from starting the reaction and increase amount from starting |
|---|---|---|---|---|---|---|
| Example 1 | Ni | MgO—NiO | — | 85 → 85 | 6% | 7% (1%) |
| Example 2 | Ni—Cu | MgO—NiO | 0.1 | 20 → 20 | 7% | 8% (1%) |
| Example 3 | Ni | MgO—NiO | — | 50 → 50 | 6% | 6% (0%) |
| Example 4 | Ni—Pt | MgO—NiO | — | 80 → 80 | 5% | 5.5% (0.5%) |
| Comparative example 1 | Ni | Al$_2$O$_3$ | — | 100 → 150 | 7% | 10% (3%) |

Example 5

Methanol Modification Experiment

Powders of 1 μm average particle size CuO and 1 μm average particle size MgO were measured by 1:20 mole ratio, and mixed homogeneously by a planetary ball mill. After the mixture, an ethyl cellulose based binder was added to the powder mixture so as to be kneaded. A compact was produced using an extrusion molder through a honeycomb mouthpiece having 1 mm cell size and 0.5 mm wall thickness. Then, with the compact introduced into a debinding furnace, the temperature was raised to 350° C. over 5 hours per each minute for debinding at 350° C. for 1 hour. After debinding, with the specimen moved to an atmosphere furnace, the temperature was raised to 1,100° C. over 10 hours for sintering at 1,100° C. for 5 hours.

The honeycomb sintered compact accordingly obtained has 1 mm unit cell (hole) size and 0.5 mm wall thickness as purposed.

The honeycomb sintered compact cut out for 2 cc size was introduced into a modification apparatus. After substitution by an argon gas, it was further substituted by a hydrogen gas by 100 ml per minute. The temperature was raised to 500° C. by 10° C./minute speed for reduction at 500° C. for 10 minutes.

After the reduction, with the hydrogen gas supply stopped and after substitution by an argon gas, a modification experiment was carried out with the metal oxide sintered structure produced by the above-mentioned method using a methanol vapor/water vapor gas mixture (1:2). The modification temperature was 350° C. The results are shown in the Table 2.

Example 6

A metal oxide sintered structure was produced in the same process as in the example 1 except that a powder mixture of NiO and CuO was used instead of NiO powders by a mixture ratio of MgO:NiO:CuO=2:1:0.1 (mole ratio).

The honeycomb sintered compact was introduced into an apparatus for a modification experiment. After substitution by an argon gas, it was further substituted by a hydrogen gas by 100 ml per minute. The temperature was raised to 900° C. by 10° C./minute speed for reduction at 900° C. for 10 minutes.

The structure accordingly obtained was evaluated by the same experiment as in the example 5. The results are shown in the Table 2.

Comparative Example 2

After soaking the alumina honeycomb used in the comparative example 1 in a copper nitrate, the honeycomb was taken out so as to be soaked in an ammonium carbonate. Then, the honeycomb was taken out for drying in a drier at 110° C., and it was heated to 200° C. in a hydrogen for reduction.

According to observation of the organism after the reduction by the FE-SEM, the metal copper particle size was 90 nm, and the numerical density was $7 \times 10^{12}$ pieces/m$^2$.

Moreover, metal copper particle aggregation was observed at the corner parts as the partition wall intersection parts of the honeycomb, and the numerical density per volume within 0.5 μm from the intersection parts was more than 2.5 times as much as that of the partition wall center parts.

Using the honeycomb, the modification experiment as in the example 2 was carried out.

The results are shown in the Table 2.

TABLE 2

| | | | | Methanol modification results | | |
|---|---|---|---|---|---|---|
| | Metal particles | Metal oxide skeleton | Cu/Ni atomic ratio (%) | Metal particle diameter (before reaction → after reaction) | Residual methanol density after 30 minutes from starting the reaction | Residual methanol density after 5 hours from starting the reaction and increase amount from starting |
| Example 5 | Cu | MgO | — | 80 → 80 | 7% | 8% (2%) |
| Example 6 | Cu—Ni | MgO—NiO | 0.5 | 30 → 30 | 6% | 7% (1%) |
| Example 9 | Cu—Ni | MgO—NiO | 0.5 | 30 → 30 | 5% | 4% (1%) |
| Comparative example 2 | Cu | Al$_2$O$_3$ | — | 90 → 120 | 7% | 10% (3%) |
| Comparative example 5 | Cu—Ni | Al$_2$O$_3$ | 0.5 | 100 → 120 | 8% | 8.5% |

Example 7

A metal oxide sintered structure was produced in the same process as in the example 6. The honeycomb sintered compact was introduced into an apparatus for a modification experiment. After substitution by an argon gas, it was further substituted by a hydrogen gas by 100 ml per minute. The temperature was raised to 900° C. by 10° C./minute speed for reduction at 900° C. for 10 minutes.

After the reduction, with the hydrogen gas supply stopped and after substitution by an argon gas, a modification experiment was carried out with the metal oxide sintered structure produced by the above-mentioned method using an ethanol vapor/water vapor gas mixture (1:4). The modification temperature was 600° C. The results are shown in the Table 3.

Comparative Example 3

After soaking the alumina honeycomb used in the comparative example 1 in a copper nitrate and a nickel nitrate, the honeycomb was taken out so as to be soaked in an ammonium carbonate. Then, the honeycomb was taken out for drying in a drier at 110° C., and it was heated to 200° C. in a hydrogen for reduction.

According to observation of the organism after the reduction by the FE-SEM, the particle size of the alloy of the metal copper and the nickel was 100 nm, and the numerical density was $7 \times 10^{12}$ pieces/m$^2$.

Moreover, metal copper particle aggregation was observed at the corner parts as the partition wall intersection parts of the honeycomb, and the numerical density per volume within 0.5 μm from the intersection parts was more than 3 times as much as that of the partition wall center parts.

Using the honeycomb, the ethanol modification experiment as in the example 2 was carried out.

The results are shown in the Table 3.

TABLE 3

| | Metal particles | Metal oxide skeleton | Cu/Ni atomic ratio (%) | Metal particle diameter (before reaction → after reaction) | Residual ethanol density after 30 minutes from starting the reaction | Residual ethanol density after 5 hours from starting the reaction and increase amount from starting |
|---|---|---|---|---|---|---|
| | | | | Ethanol modification results | | |
| Comparative example 3 | Cu—Ni | MgO—NiO | 1.2 | 30 → 35 | 4% | 4% (0%) |
| Example 7 | Cu—Ni | Al$_2$O$_3$ | — | 90 → 120 | 5% | 6% (1%) |

Example 8

With the metal oxide sintered structure as a honeycomb porous substance produced in the example 1 used, an impregnation method was further carried out using a molybdenum acetyl acetonate. After impregnation, it was dried at 110° C. and heated in a hydrogen of 400° C. so as to produce an alloy. The porous substance after the alloy formation was observed by the FE-SEM so as to find that Ni and Mo were integrated.

According to composition measurement by the EDX, it was found that Ni:Mo=1:1 (atomic ratio).

A desulfurization experiment was carried out using the metal oxide sintered structure produced as mentioned above. In the desulfurization, the desulfurization amount was monitored at 400° C. from the city gas (13A). The results are shown in the Table 4.

Comparative Example 4

Catalyst particles were produced using an alumina honeycomb of the same shape as in the example 1 by the impregnation method of a nickel acetate and a molybdenum acetyl acetonate. Then, the honeycomb was dried in a drier at 110° C., and it was heated to 400° C. in a hydrogen for reduction.

According to observation of the organism after the reduction by the FE-SEM, NiMo particle size was 110 nm, and the numerical density was 3×10$^{12}$ pieces/m$^2$.

Moreover, metal nickel particle aggregation was observed at the corners as the partition wall intersection parts of the honeycomb, and the numerical density per volume within 0.5 μm from the corner parts was more than 3.2 times as much as that of the partition wall center parts.

Using the honeycomb, the desulfurization experiment as in the example 6 was carried out.

The results are shown in the Table 4.

Example 9

Powders of 1 μm average particle size NiO, 1 μm average particle size CuO and 1 μm average particle size MgO were measured by MgO:NiO:CuO=1:2:0.1 mole ratio, and dispersed and mixed homogeneously in an ethanol by a planetary ball mill. To the mixture, a polycarboxyl amine was added as a dispersing agent by about 1% and further mixed and kneaded for forming a slurry. A polyurethane foam was impregnated therewith, and dried. Then, it was heated to 650 to 700° C. by about 100° C./hour temperature raising rate. It was maintained at the temperature for 3 hours for burning off the polyurethane so as to produce a porous ceramic precursor compact. Then, with the specimen of the compact moved into an atmosphere furnace, the temperature was raised to 1,300° C. over 10 hours for sintering at 1,300° C. for 5 hours.

The foam-like sintered compact accordingly obtained comprises open cells having 500 μm cell diameter and 0.1 mm wall thickness as purposed.

The foam-like sintered compact cut out for 2 cc size was introduced into a modification apparatus. After substitution by an argon gas, it was further substituted by a hydrogen gas by 100 ml per minute. The temperature was raised to 900° C. by 10° C./minute speed for reduction at 900° C. for 10 minutes.

After the reduction, with the hydrogen gas supply stopped and after substitution by an argon gas, a modification experiment was carried out using a methanol vapor/water vapor gas mixture (1:2). The modification temperature was 350° C. As to the modification reaction, the gas after the reaction was sampled by the mass analysis for measuring the gas composition quantatively for the measurement of the modification efficiency by the same experiment as in the example 5.

The results are shown in the Table 2.

Comparative Example 5

On the other hand, a foam with the same shape as in the example 9 was produced using an alumina as the material powders. Then, as in the comparative example 3, it was

TABLE 4

| | Metal particles | Metal oxide skeleton | Cu/Ni atomic ratio (%) | Metal particle diameter (before reaction → after reaction) | Residual sulfur amount after 30 minutes from starting the reaction | Residual sulfur amount after 5 hours from starting the reaction and increase amount from starting |
|---|---|---|---|---|---|---|
| | | | | Desulfurization result | | |
| Example 8 | NiMo | MgO—NiO | — | 90 → 90 | 0.7% | 0.8% (0.1%) |
| Comparative example 4 | NiMo | Al$_2$O$_3$ | — | 110 → 130 | 0.9% | 1.1% (0.2%) | reduced using a copper nitrate and a nickel nitrate for supporting alloy particles of a metal copper and a nickel on the foam inner wall.

According to observation of the organism after supporting by an FE-SEM, the particle size of the alloy of the metal copper and the nickel was 100 nm, and a lot of aggregation was observed at the triple point of the grain boundary, or the like. With the material, the same modification experiment as in the examples was carried out. The results are shown in the Table 2.

According to the present invention, a metal oxide sintered structure having a highly efficient catalyst function and a low production cost, suitable as a catalyst for a fuel cell, and a production method therefor can be provided.

What is claimed is:

1. A metal oxide sintered structure comprising a partition wall substantially made of a sintered compact as a solid solution phase of metal oxides: (1) a nickel oxide and/or a copper oxide, and (2) a magnesium oxide, formed so as to surround a channel provided so as to allow passage of a fluid, and metal particles existing on the partition wall surface of the metal oxides, wherein the metal particles are precipitated from the metal oxide sintered compact comprising the partition wall by hydrogen reduction.

2. The metal oxide sintered structure according to claim 1, wherein the copper oxide is present and is provided by 0.1% or more and 5% or less in the atomic ratio with respect to the magnesium oxide.

3. The metal oxide sintered structure according to claim 1, wherein the copper oxide is present and is provided by 10% or more and 20% or less in the atomic ratio with respect to the magnesium oxide.

4. The metal oxide sintered structure according to claim 1, wherein the metal particle amount in the partition wall corner parts of the channels is double as much as the metal particle amount in the partition wall flat surface part or less.

5. A method of producing the metal oxide sintered structure according to claim 1, comprising mixing and kneading nickel oxide and/or copper oxide powders, magnesium oxide powder, and an organic binder, thereby forming a mixture, forming a compact having channels so as to allow communication of a fluid by extrusion molding of the mixture, forming a metal oxide sintered structure precursor by eliminating the organic binder in the compact, sintering the nickel oxide and/or cobalt oxide, and magnesium oxide, by heating the metal oxide sintered structure precursor, and precipitating the metal particles on the sintered compact surface by reducing the sintered compact in a hydrogen atmosphere.

6. A catalyst having a honeycomb or foam structure, and comprising a partition wall substantially made of a sintered compact as a solid solution phase of metal oxides: (1) a nickel oxide and/or a copper oxide, and (2) a magnesium oxide, formed so as to surround a channel provided so as to allow passage of a fluid, and metal particles existing on the partition wall surface of the metal oxides, wherein the metal particles are precipitated from the metal oxide sintered compact comprising the partition wall by hydrogen reduction.

7. The catalyst according to claim 6, wherein the copper oxide is present and is provided by 0.1% or more and 5% or less in the atomic ratio with respect to the magnesium oxide.

8. The catalyst according to claim 6, wherein the copper oxide is present and is provided by 10% or more and 20% or less in the atomic ratio with respect to the magnesium oxide.

9. The catalyst according to claim 6, wherein the metal particle amount in the partition wall corner parts of the channels is double as much as the metal particle amount in the partition wall flat surface part or less.

10. A catalyst for processing a hydrocarbon, comprising a partition wall substantially made of a sintered compact as a solid solution phase of a copper oxide and a magnesium oxide formed so as to surround a channel provided so as to allow passage of a fluid, and metal particles existing on the partition wall surface of the metal oxides, wherein the metal particles are precipitated from the metal oxide sintered compact comprising the partition wall by the hydrogen reduction, and the copper oxide is provided by 0.1% or more and 5% or less in the atomic ratio with respect to the magnesium oxide.

11. A catalyst for processing an aliphatic lower alcohol, comprising a partition wall substantially made of a sintered compact as a solid solution phase of a copper oxide and a magnesium oxide formed so as to surround a channel provided so as to allow passage of a fluid, and metal particles existing on the partition wall surface of the metal oxides, wherein the metal particles are precipitated from the metal oxide sintered compact comprising the partition wall by the hydrogen reduction, and the copper oxide is provided by 0.1% or more and 20% or less in the atomic ratio with respect to the magnesium oxide.

* * * * *